(12) United States Patent
Wu

(10) Patent No.: US 9,122,031 B2
(45) Date of Patent: Sep. 1, 2015

(54) OPTICAL CONNECTOR

(71) Applicant: HON HAI PRECISION INDUSTRY CO., LTD., New Taipei (TW)

(72) Inventor: Kai-Wen Wu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/264,059

(22) Filed: Apr. 29, 2014

(65) Prior Publication Data

US 2014/0321816 A1  Oct. 30, 2014

(51) Int. Cl.
*G02B 6/42* (2006.01)

(52) U.S. Cl.
CPC .............. *G02B 6/4284* (2013.01); *G02B 6/428* (2013.01); *G02B 6/42* (2013.01); *G02B 6/4214* (2013.01)

(58) Field of Classification Search
CPC .. G02B 6/4246; G02B 6/4238; G02B 6/4245; G02B 6/12
See application file for complete search history.

(56) References Cited

U.S. PATENT DOCUMENTS

| 7,118,293 | B2* | 10/2006 | Nagasaka et al. | 385/89 |
| 8,390,083 | B2* | 3/2013 | O'Donnell et al. | 257/414 |
| 2012/0134626 | A1* | 5/2012 | Lin | 385/33 |
| 2014/0294340 | A1* | 10/2014 | Yasuda et al. | 385/14 |

* cited by examiner

*Primary Examiner* — Mark Robinson
*Assistant Examiner* — Eftihia Barnes
(74) *Attorney, Agent, or Firm* — Novak Druce Connolly Bove + Quigg LLP

(57) ABSTRACT

Optical connector includes a circuit board, a photoelectric element, a driver chip, a coupler, and a holder holding an optical fiber. The circuit board includes a substrate having a first surface and an opposing second surface and a circuit portion formed on the substrate. The substrate defines a receiving groove in the second surface and a through hole passing through a bottom surface of the receiving groove and the first surface. The photoelectric element and the driver chip are positioned on the bottom surface, and the photoelectric element aligns with the through hole. The coupler is positioned on the first surface and aligns with the photoelectric element through the through hole. The holder is supported on the first surface and connected to the coupler. The coupler optically couples the optical fiber with the photoelectric element.

8 Claims, 5 Drawing Sheets

OPTICAL CONNECTOR

FIELD

The present disclosure relates to connectors, and particularly to an optical connector.

BACKGROUND

In an optical communication field, optical fiber connectors are configured for connecting optical fibers to electronic devices. An optical fiber connector generally includes a circuit board, an emitter, a receiver, a driver chip, a coupler, and a holder for holding optical fibers. The emitter, the receiver, and the driver chip are electrically connected to the circuit board. The coupler is fixedly connected to the circuit board covering the emitter and the receiver. The holder is connected to a side of the coupler.

BRIEF DESCRIPTION OF THE DRAWINGS

The components of the drawing are not necessarily drawn to scale, the emphasis instead being placed upon clearly illustrating the principles of the embodiments of the present disclosure.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The references "a plurality of" and "a number of" mean "at least two."

Figure 1:
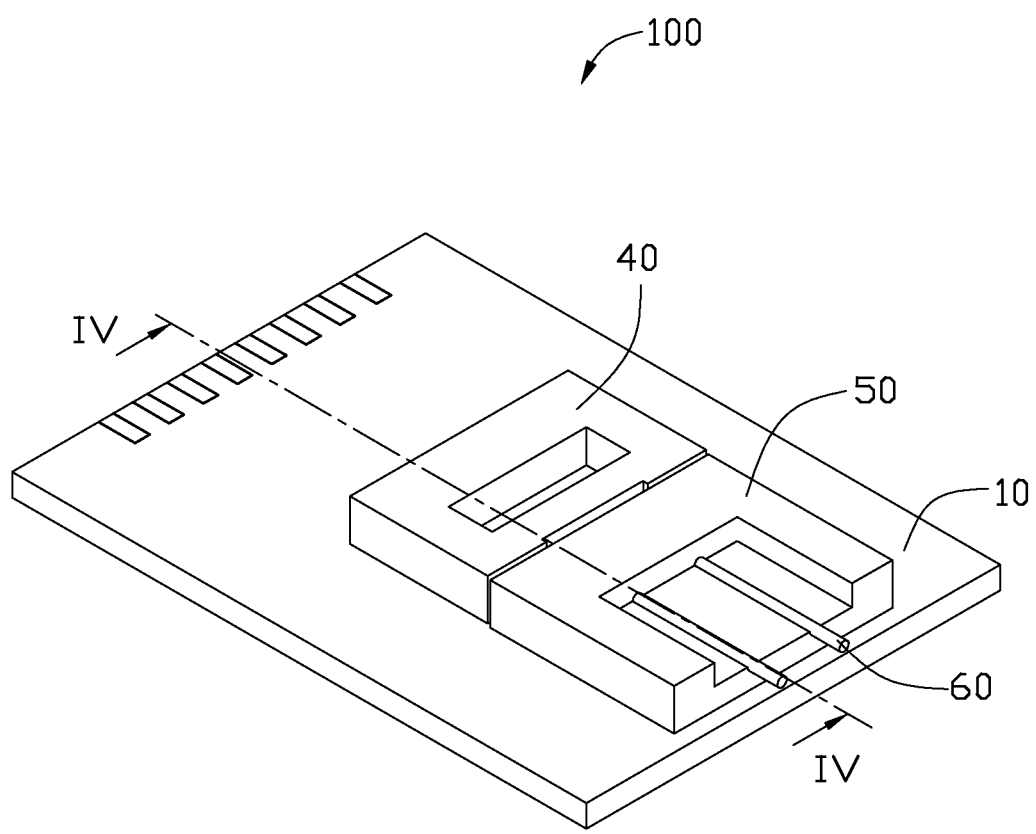
FIG. 1 is an isometric view of an optical connector, according to an exemplary embodiment of the present disclosure.
Figure 2:
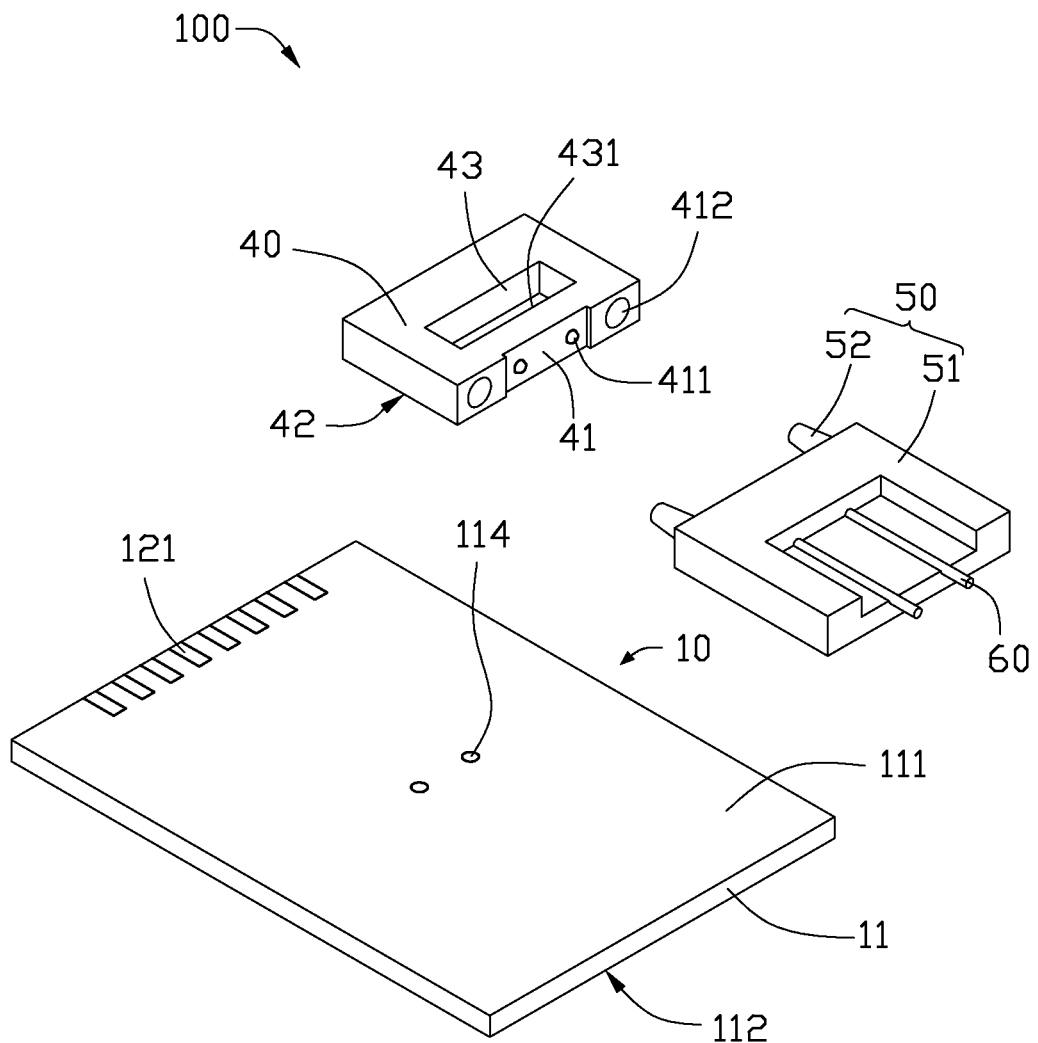
FIG. 2 is an exploded view of the optical connector of FIG. 1.
Figure 3:
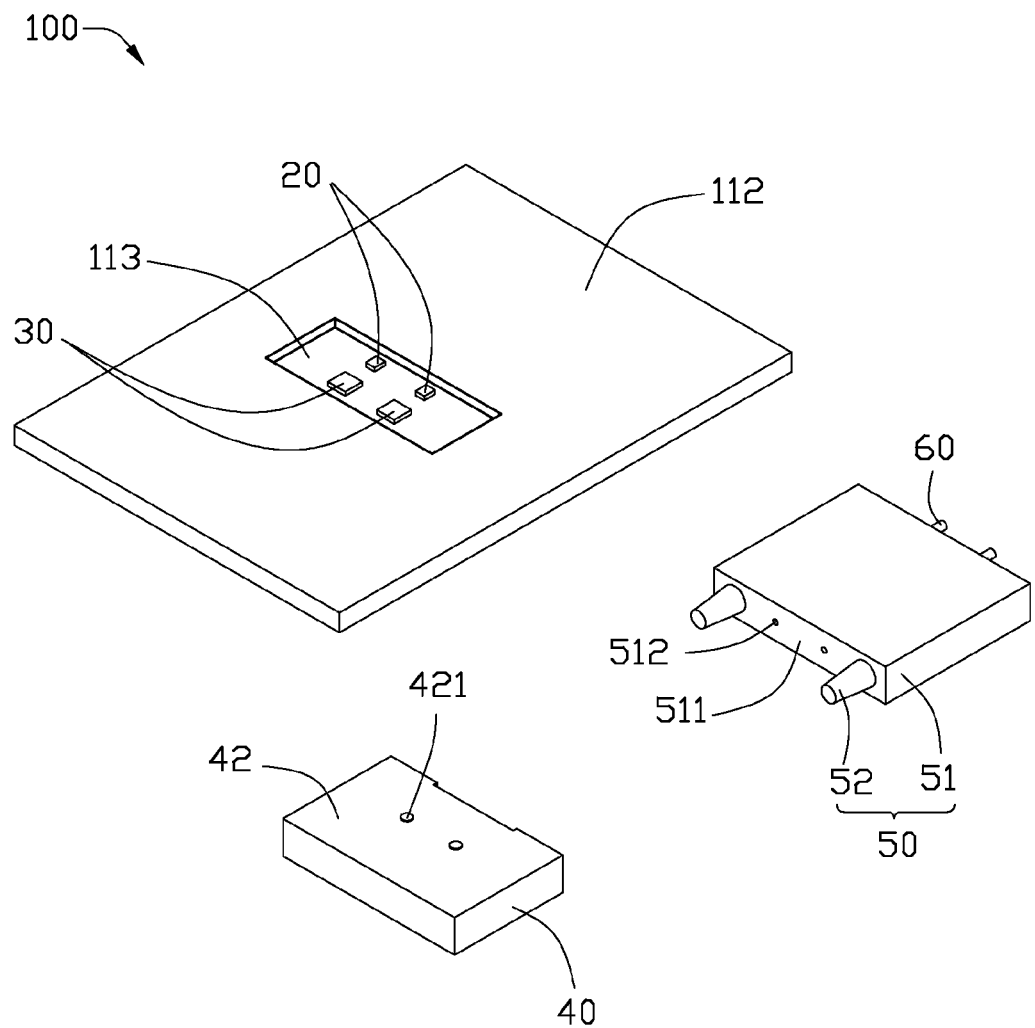
FIG. 3 is similar to FIG. 1, but shows the optical connector from another aspect.
Figure 4:
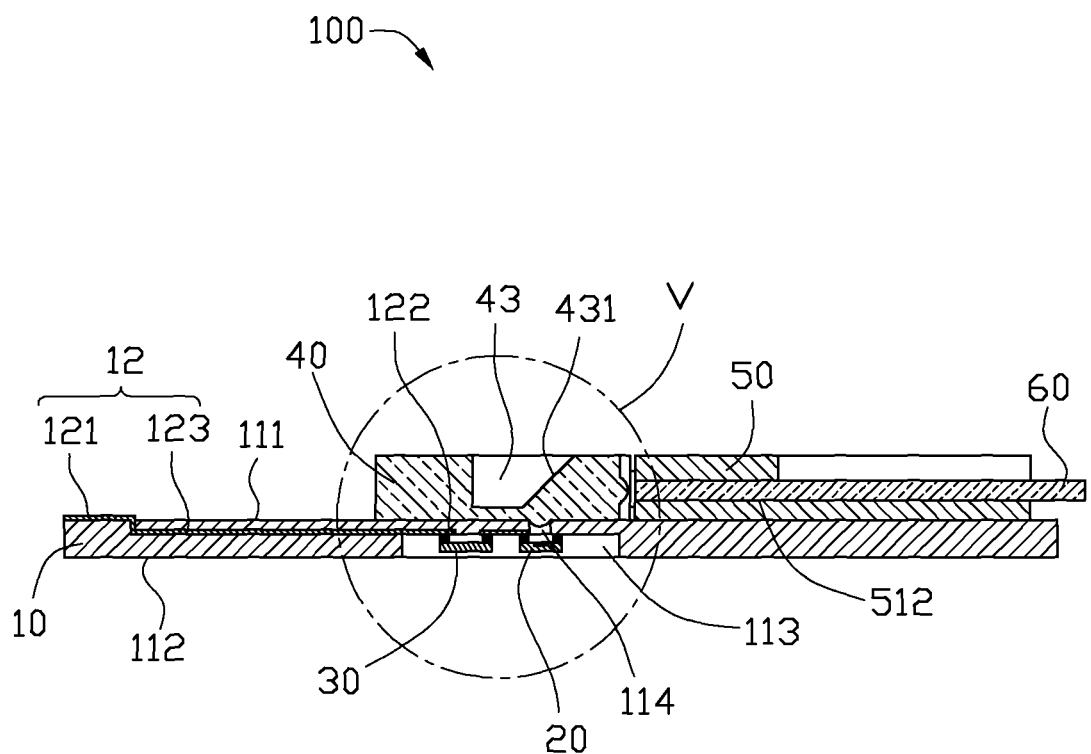
FIG. 4 is a cross-sectional view of the optical connector of FIG. 1, taken along line IV-IV.
Figure 5:
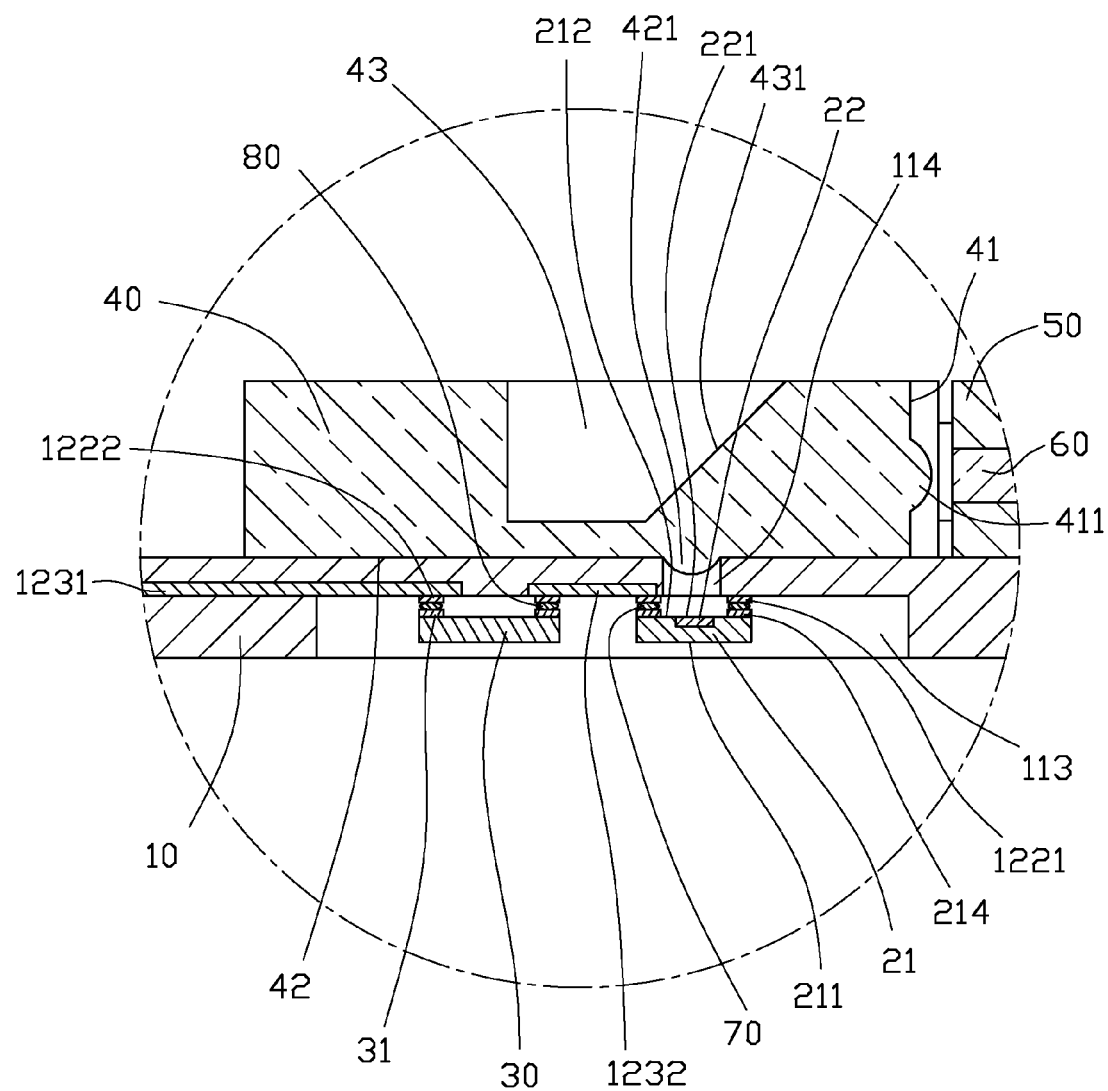
FIG. 5 is an enlarged view of part V of the optical connector of FIG. 4.

FIGS. 1-5 illustrate one embodiment of an optical connector 100. The optical connector 100 includes a circuit board 10, a number of photoelectric elements 20, a number of driver chips 30, a coupler 40, a holder 50, and a number of optical fibers 60 corresponding to the photoelectric elements 20.

The circuit board 10 includes a substrate 11 and a circuit portion 12 formed on the substrate 11. The substrate 11 includes a first surface 111 and a second surface 112 opposite to the first surface 111. In this embodiment, a material of the substrate is silicon. The substrate 11 defines a receiving groove 113 in the second surface 112 and a number of through holes 114 communicating with the receiving groove 113. The receiving groove 113 is recessed from the second surface 112 to the first surface 111. The through holes 114 pass through a bottom surface of the receiving groove 113 and the first surface 111. The circuit portion 12 electrically connects the photoelectric elements 20 to the driver chips 30. When the optical connector 100 is connected to an electronic device (not shown), the circuit portion 12 electrically couples the photoelectric elements 20 and the driver chips 30 to the electronic device. The circuit portion 12 includes a number of contacting pads 121, a number of soldering pads 122, and a connecting circuit 123 connected to the contacting pads 121 and the soldering pads 122. The contacting pads 121 are formed on the first surface 111, when the optical connector 100 is connected to the electronic device, the contacting pads 121 are electrically contacted with the electronic device. In this embodiment, the contacting pads 121 are positioned adjacent to a peripheral edge of the substrate 11. The soldering pads 122 are formed on the bottom surface of the receiving groove 113. The soldering pads 122 includes a number of first soldering pads 1221 corresponding to the photoelectric elements 20 and a number of second soldering pads 1222 corresponding to the driver chips 30. The connecting circuit 123 is embedded in the substrate 11. In detail, the substrate 11 can be a multi-layer substrate, and the connecting circuit 123 can be formed in the substrate 11 by a through silicon via (TSV) process. The connecting circuit 123 includes a first circuit 1231 electrically connecting the driver chips 30 to the contacting pads 121 and a second circuit 1232 electrically connecting the photoelectric elements 20 to the driver chips 30.

The photoelectric elements 20 can be optical signal emitters or optical receivers, or both of the optical signal emitters and the optical signal receivers. The optical signal emitters can be laser diodes, and the optical signal receivers can be photodiodes. In this embodiment, the number of the photoelectric elements 20 is two, one of the photoelectric elements 20 is an optical signal receiver, and the other of the photoelectric elements 20 is an optical signal emitter. Each photoelectric element 20 includes a base 21 and an optical portion 22 formed on the base 21. The base 21 includes a bottom surface 211 and a top surface 212 opposite to the bottom surface 211. The base 21 includes a number of first conductive pins 214 corresponding to the first soldering pads 1221. The optical portion 22 includes an optical surface 221, the optical portion 22 emits/receives optical signals through the optical surface 221. The photoelectric elements 20 are positioned on the bottom surface by flip-chip. In detail, the top surface 212 faces the bottom surface of the receiving groove 113, the optical portion 22 of each photoelectric element 20 is aligned with a corresponding through hole 114, the first conductive pins 214 are respectively connected to the corresponding first soldering pads 1221. In this embodiment, each first conductive pin 214 is connected to a corresponding first soldering pad 1221 by a first solder ball 70.

The driver chips 30 drive the photoelectric elements 20 to emit/receive optical signals. In this embodiment, the number of the driver chips 30 is two, one of the driver chips 30 drives a corresponding photoelectric element 20 to emit optical signals, and the other of the driver chips 30 drives the other photoelectric element 20 to receive optical signals. Each driver chip 30 includes a number of second conductive pins 31 each corresponding to a second soldering pad 1222. The driver chip 30 is electrically connected to the circuit board 10 by flip-chip. In detail, each second conductive pin 31 is connected to a corresponding second soldering pad 1222 via a second soldering ball 80.

The coupler 40 optically couples the optical fibers 60 with the photoelectric elements 20. The coupler 40 is substantially rectangular-shaped. The coupler 40 includes a first side surface 41 and a second side surface 42 substantially perpendicular to the first side surface 41. The coupler 40 includes a number of first lenses 411 formed on the first side surface 41 and a number of second lenses 421 formed on the second side surface 42. The number of the second lenses 421 is the same as the number of the first lenses 411. In this embodiment, the number of the first lenses 411 is two. The coupler 40 defines two engaging holes 412 in the first side surface 41. The coupler 40 further defines a groove 43 in a top surface. The groove 43 defines a reflecting surface 431 in the coupler 40. An included angle between the reflecting surface 431 and an optical axis of each first lens 411 is about 45 degrees, and an included angle between the reflecting surface 431 and an optical axis of each second lens 421 is about 45 degrees. In other embodiments, a shape and position of the groove 43 can be changed according to the different requirements, as long as the reflecting surface 431 is at a position that can reflect light between the first lenses 411 and the second lenses 421.

In assembly, the coupler 40 is positioned on the first surface 111 of the substrate 11, the second side surface 42 is in contact with the first surface 111, and the second lenses 421 are aligned with the photoelectric elements 20, respectively.

The holder 50 holds the optical fibers 60 and optically aligns the optical fibers 60 with the second lenses 421. The holder 50 includes a main body 51 and two engaging posts 52 corresponding to the engaging holes 412. The main body 51 is substantially rectangular-shaped. The main body 51 includes a junction surface 511 facing the coupler 40. The engaging posts 52 are formed on the junction surface 511. The main body 51 defines a number of positioning holes 512 corresponding to the optical fibers 60. The positioning holes 512 pass through the junction surface 511. The holder 50 is supported on the first surface 111 of the substrate 11 and is connected to the coupler 40, the engaging posts 52 are respectively engaged in the engaging holes 412, and the positioning holes 512 are aligned with the first lenses 411, respectively. Because the holder 50 is directly supported on the substrate 11, a connection stability between the holder 50 and the coupler 40 is enhanced.

The optical fibers 60 transmit optical signals. In the embodiment, a number of the optical fiber 60 is two, one of the optical fibers 60 is an optical signal input fiber, and the other of the optical fibers 60 is an optical signal output fiber. An end of each optical fiber 60 is received and can be fixed in a corresponding positioning hole 512.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the disclosure.

What is claimed is:

1. An optical connector, comprising:
   a circuit board, comprising:
      a substrate comprising a first surface and a second surface opposite to the first surface, the substrate defining a receiving groove in the second surface and a through hole passing through a bottom surface of the receiving groove and the first surface; and
      a circuit portion formed on the substrate;
   a photoelectric element, the photoelectric element being positioned on the bottom surface of the receiving groove and being aligned with the through hole;
   a driver chip for driving the photoelectric element, the driver chip being positioned on the bottom surface of the receiving groove, the driver chip and the photoelectric element being electrically connected to each other by the circuit portion;
   a coupler positioned on the first surface of the substrate, the coupler being aligned with the photoelectric element through the through hole; and
   a holder for holding an optical fiber, the holder being supported on the first surface of the substrate and being connected to the coupler, and the coupler optically coupling the optical fiber with the photoelectric element, wherein the circuit portion comprises a plurality of contacting pads, a plurality of soldering pads, and a connecting circuit connecting the contacting pads to the soldering pads, the contacting pads are formed on the first surface, the soldering pads are formed on the bottom surface of the receiving groove, the connecting circuit comprises a first circuit and a second circuit, an L-shaped portion of the first circuit is entirely embedded in the substrate and is electrically connected to the contacting pads, a striped portion of the first circuit extends from the L-shaped portion of the first circuit and is exposed at the receiving groove, the striped portion of the first circuit is electrically connected to the driver chip, and the second circuit is exposed at the receiving groove and electrically connects the photoelectric element to the driver chip.

2. The optical connector of claim 1, wherein the photoelectric element comprises a plurality of first conductive pins, the driver chip comprises a plurality of second conductive pins, the soldering pads comprise a plurality of first soldering pads corresponding to the first conductive pins and a plurality of second soldering pads corresponding to the second conductive pins, the first conductive pins are respectively soldered on the first soldering pads, and the second conductive pins are respectively soldered on the second soldering pads.

3. The optical connector of claim 1, wherein the photoelectric element comprises a base and an optical portion formed on the base, and the optical portion is aligned with the coupler through the through hole.

4. The optical connector of claim 1, wherein the coupler comprises a first side surface, a second side surface substantially perpendicular to the first side surface, and a reflecting surface, the second side surface is in contact with the first surface of the substrate, and the reflecting surface reflects optical signals between the first side surface and the second side surface.

5. The optical connector of claim 4, wherein the coupler comprises a first lens formed on the first side surface and a second lens formed on the second side surface, and the second lens is aligned with the photoelectric element through the through hole.

6. The optical connector of claim 4, wherein the coupler defines two engaging holes in the first side surface, the holder comprises two engaging posts corresponding to the engaging holes, and the engaging posts are respectively engaged into the engaging holes.

7. The optical connector of claim 4, wherein the coupler defines a groove therein, and the reflecting surface is formed in the groove.

8. The optical connector of claim 4, wherein the holder comprises a junction surface facing toward the coupler, the holder defines a positioning hole holding the optical fiber, and the positioning hole passes through the junction surface.

* * * * *